United States Patent
Konanur et al.

(10) Patent No.: US 9,306,628 B2
(45) Date of Patent: Apr. 5, 2016

(54) MECHANISM FOR GENERATING A HYBRID COMMUNICATION CIRCUITRY FOR FACILITATING HYBRID COMMUNICATION BETWEEN DEVICES

(71) Applicants: Anand S. Konanur, San Jose, CA (US); Ulun Karacaoglu, San Diego, CA (US); Kwan Ho Lee, Mountain View, CA (US); Akihiro Takagi, San Mateo, CA (US)

(72) Inventors: Anand S. Konanur, San Jose, CA (US); Ulun Karacaoglu, San Diego, CA (US); Kwan Ho Lee, Mountain View, CA (US); Akihiro Takagi, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 14/129,948

(22) PCT Filed: Oct. 1, 2013

(86) PCT No.: PCT/US2013/062878
§ 371 (c)(1),
(2) Date: Dec. 28, 2013

(87) PCT Pub. No.: WO2015/050528
PCT Pub. Date: Apr. 9, 2015

(65) Prior Publication Data
US 2015/0093988 A1  Apr. 2, 2015

(51) Int. Cl.
*H04B 5/00* (2006.01)
*H04W 4/00* (2009.01)
(Continued)

(52) U.S. Cl.
CPC .......... *H04B 5/0031* (2013.01); *H04L 63/0884* (2013.01); *H04W 4/008* (2013.01); *H04W 12/06* (2013.01)

(58) Field of Classification Search
CPC ..... H04B 5/0031; H04W 4/008; H04W 88/06
USPC ................ 455/41.1, 41.2, 574, 343.1, 343.2, 455/343.4, 68; 719/320; 381/67; 235/492, 235/451, 449; 345/174, 169, 173; 324/318, 324/322, 42, 44, 51; 375/259, 316, 340, 375/219; 705/39, 76; 307/104
See application file for complete search history.

(56) References Cited

U.S. PATENT DOCUMENTS 4,793,353 A * 12/1988 Borkan ........................... 607/60
6,130,602 A * 10/2000 O'Toole et al. ............ 340/10.33
(Continued)

FOREIGN PATENT DOCUMENTS

KR  10-2013-0055729   11/2008
KR  10-2011-0050313   5/2011

OTHER PUBLICATIONS

PCT/US2013/062878, "Notification of Transmittal of the International Search Report and the Written Opinion of the International Searching Authority, or the Declaration" mailed Jun. 27, 2014, pp. 16.
(Continued)

*Primary Examiner* — Tan H Trinh
(74) *Attorney, Agent, or Firm* — Blakely, Sokoloff, Taylor & Zafman LLP

(57) ABSTRACT

A mechanism is described for facilitating hybrid communication between devices according to one embodiment. A method of embodiments, as described herein, includes coupling an inductive coil of a near proximity circuitry with a capacitive pad of a body area circuitry to form a hybrid circuitry, and facilitating, via the hybrid circuitry, the hybrid communication between a plurality of devices.

18 Claims, 7 Drawing Sheets

(51) Int. Cl.
*H04L 29/06* (2006.01)
*H04W 12/06* (2009.01)

(56) References Cited

U.S. PATENT DOCUMENTS

| | | | |
|---|---|---|---|
| 6,173,899 B1 * | 1/2001 | Rozin | 235/492 |
| 7,190,165 B2 * | 3/2007 | Hammond et al. | 324/318 |
| 8,537,907 B2 * | 9/2013 | Sung | 375/259 |
| 8,706,172 B2 * | 4/2014 | Priyantha et al. | 455/574 |
| 2006/0095369 A1 * | 5/2006 | Hofi | 705/39 |
| 2007/0247431 A1 * | 10/2007 | Skillman et al. | 345/169 |
| 2008/0054638 A1 * | 3/2008 | Greene et al. | 290/1 R |
| 2008/0219464 A1 * | 9/2008 | Smith | 381/67 |
| 2008/0272889 A1 * | 11/2008 | Symons | 340/10.1 |
| 2009/0213081 A1 * | 8/2009 | Case, Jr. | 345/173 |
| 2011/0115652 A1 * | 5/2011 | Werner et al. | 341/24 |
| 2011/0241837 A1 * | 10/2011 | Suzuki | 340/10.1 |
| 2012/0058724 A1 * | 3/2012 | Yamada et al. | 455/41.2 |
| 2012/0135693 A1 * | 5/2012 | Teruyama | 455/68 |
| 2012/0137310 A1 * | 5/2012 | Teruyama | 719/320 |
| 2013/0231046 A1 * | 9/2013 | Pope et al. | 455/41.1 |
| 2014/0145515 A1 * | 5/2014 | Jung et al. | 307/104 |
| 2014/0203660 A1 * | 7/2014 | Adachi | 307/104 |
| 2014/0247246 A1 * | 9/2014 | Maus | 345/174 |
| 2014/0268612 A1 * | 9/2014 | Zhang et al. | 361/767 |
| 2014/0320536 A1 * | 10/2014 | Mok et al. | 345/659 |
| 2015/0056979 A1 * | 2/2015 | Davis et al. | 455/420 |
| 2015/0091859 A1 * | 4/2015 | Rosenberg et al. | 345/174 |
| 2015/0189463 A1 * | 7/2015 | Klabunde et al. | 345/169 |

OTHER PUBLICATIONS

Abdulah Korishe 'A Driver Circuit for Body-Coupled Communication', Linkoping University, Jun. 3, 2013.

* cited by examiner

US 9,306,628 B2

MECHANISM FOR GENERATING A HYBRID COMMUNICATION CIRCUITRY FOR FACILITATING HYBRID COMMUNICATION BETWEEN DEVICES

CROSS-REFERENCE TO RELATED APPLICATION

This patent application is a U.S. National Phase Application under 35 U.S.C. §371 of International Application No. PCT/US2013/062878, filed Oct. 1, 2013, entitled MECHANISM FOR GENERATING A HYBRID COMMUNICATION CIRCUITRY FOR FACILITATING HYBRID COMMUNICATION BETWEEN DEVICES by Anand S. Konanur, et al., the benefit and priority are claimed thereof and the entire contents of which are incorporated herein by reference.

FIELD

Embodiments described herein generally relate to computer networks. More particularly, embodiments relate to a mechanism for generating a hybrid communication circuitry for facilitating hybrid communication between devices.

BACKGROUND

With computing devices getting smaller and ubiquitous, seamless interaction between them is becoming increasingly critical. Further, since many of these computing devices are worn or carried on or near human body (e.g., smartphones, smartcards, devices having tags, etc.), the human body can play an important role in serving as a secure communication channel between the computing devices. However, existing body-based communication techniques, such as body area network (BAN), body sensor network (BSN), etc., are insecure, inefficient, cumbersome, fragmented, and typically based on propriety protocols. Similarly, wireless near proximity communication techniques, such as near field communication (NFC), near-me area network (NAN), personal area network (PAN), Bluetooth, etc., tend to be insecure, inefficient, and cumbersome, etc., in that they often require the air or other insecure mediums to communicate, etc., and with some commercial devices choosing simplicity over security, the implementation of devices having such techniques may be uneven despite employing, for example, various encryption techniques. Another common problem with today's proximity networks is eavesdropping and lack of privacy.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a hybrid communications network that combines any number and type of components of a proximity network circuitry (e.g., NFC) with any number and type of components of a body network circuitry (e.g., BAN) to facilitate a private network that uses a user's human body to serve as a secure medium for secure, efficient, and fast communication of data between computing devices (e.g., smartphone, tablet computer, Ultrabook, etc.) is contemplated that embodiments are not limited to any particular type of body or proximity communication techniques; however, for the sake of brevity, clarity, and ease of understanding, BAN and NFC are used as examples throughout this document.

Existing NFC-based computing devices communicate using inductive coils (also referred to as "coil antennas" or "inductive coil antennas" or simply "coils") of the NFC circuitry. For example, a computing device serving a receiving device communicates with another computing device serving as a transmitting device via the coupling of their respective coils that are further in communication with the rest of the NFC circuitry (e.g., NFC module, NFC radio, etc.) at the corresponding computing devices. Embodiments provide for maintaining the NFC circuitry within a computing device and adding a BAN-based capacitor pad to the coil of the NFC circuitry to facilitate communication of information between the capacitor pads of the receiving and transmitting computing devices using one or more human bodies to serve as communication channels.

Figure 1:
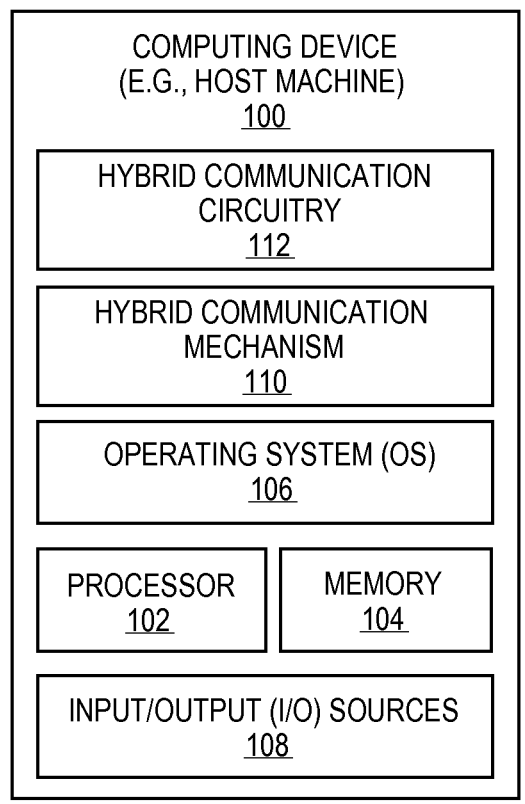
FIG. 1 illustrates a hybrid communication mechanism for employing a hybrid communication circuitry at a computing device according to one embodiment.

FIG. 1 illustrates a hybrid communication mechanism 110 for employing a hybrid communication circuitry 112 at a computing device according to one embodiment. Computing device 100 serves as a host machine for hosting hybrid communication mechanism ("hybrid mechanism") 110 for employing hybrid communication circuitry ("hybrid circuitry") 112 that includes a combination of any number and type of component of a near proximity-based communication circuitry (e.g., near field communication circuitry) and a body area-based communication circuitry (e.g., body area network circuitry) for facilitating hybrid communication between devices. Computing device 100 may include large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", and "software package" may be used interchangeably throughout this document. Similarly, terms like "job", "input", "request" and "message" may be used interchangeably throughout this document.

Figure 2A:
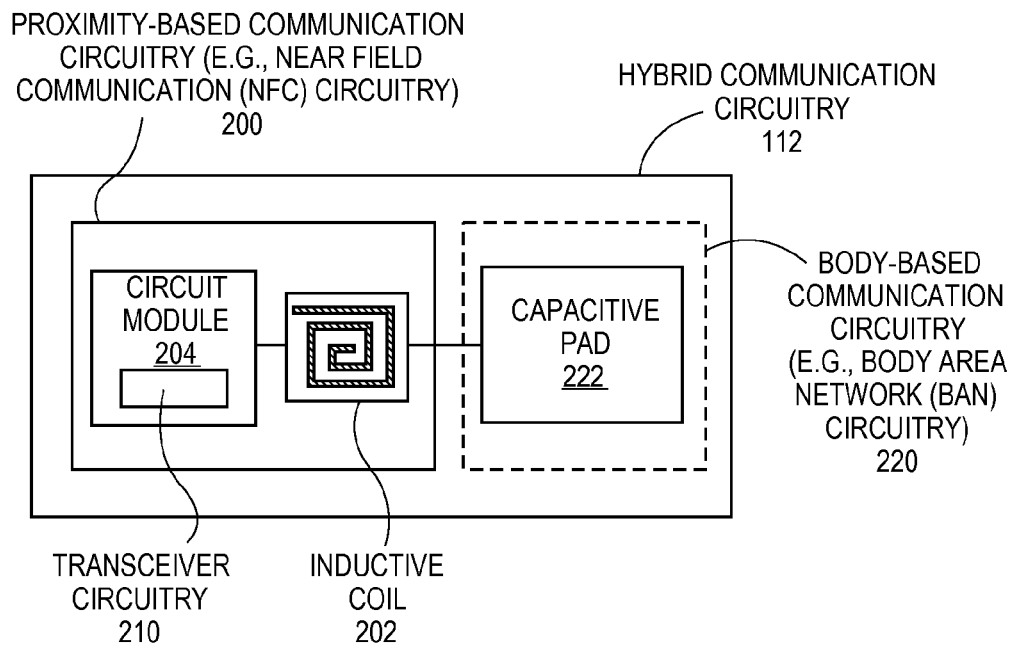
FIG. 2A illustrates a hybrid communication circuitry according to one embodiment.

FIG. 2A illustrates a hybrid communication circuitry 112 according to one embodiment. In one embodiment, hybrid circuitry 112 contains a combination of any number and type of components of near proximity-based communication circuitry 200 (e.g., near field communication circuitry) and body area-based communication circuitry 220 (e.g., body area network circuitry). As aforementioned, embodiments are not limited to NFC or BAN or Wireless BAN (WBAN); however, for brevity, clarity, and ease of understanding, NFC circuitry (or simply referenced as "NFC") and BAN circuitry (or simply referenced as "BAN" or "WBAN") are reference throughout this document as near proximity-based communication circuitry 200 and body area-based communication circuitry 220, respectively. In one embodiment, hybrid circuitry 112 may be employed at a device, such as computing device 100 of FIG. 1, such as laptop computers, desktop computers, smartphones, tablet computers, etc., and wearable devices, such as smartcards, watches, jewelry, key tags, etc.

In one embodiment, the entire NFC circuitry 200 may be maintained or preserved, where a BAN circuitry component, such as capacitive pad 222, may be added to NFC circuitry 200 to facilitate a hybrid body-based near proximity communications network for hybrid body-based near proximity communication between devices (e.g., computing devices and other devices, such as embedded smartcards, embedded watches, etc.). NFC refers to a near-proximity communication network that is considered a standard for mobile computing devices, such as smartphones, and other devices, such as NFC embedded or tagged devices, smartcards, key tags, etc., for establishing radio communication between these devices by touching the devices with each other or bringing them within an acceptable close proximity, such as from a few millimeters to a few inches. BAN refers to a wireless body-based network for wearable devices, such as watches, jewelry, clothing or apparel, clothing accessories, footwear, etc. BAN may include several miniaturized body sensor units (BSUs) along with a single body central unit (BCU) to implement communication within immediate proximity of a human body.

As illustrated, NFC circuitry 200 may include inductive coil 202 and other circuit components, such as circuit module 204 (e.g., NFC module). NFC module 204 may include transceiver circuitry 210 for processing electrical signals in inductive coil 202 and further used for providing tuning to inductive coil 202 for maximum power transfer during transmission and/or reception of operations, such as data communication operations between devices. NFC transceiver circuitry 210 may include one or more receivers and one or more transmitters serving as communication components for receiving data and transmitting data, respectively.

Figure 2B:
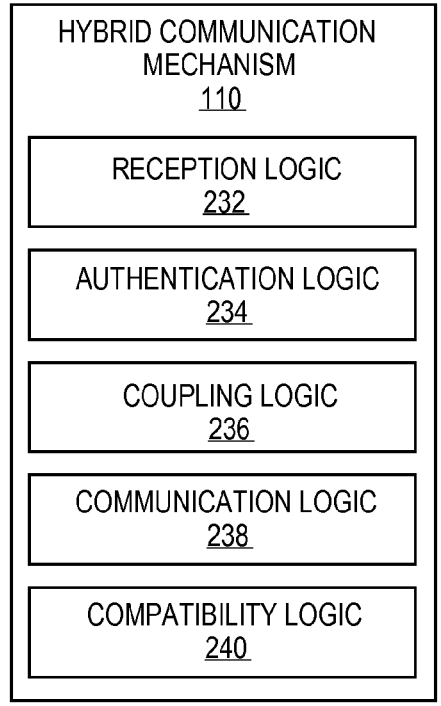
FIG. 2B illustrates a hybrid circuitry mechanism according to one embodiment.
Figure 2C:
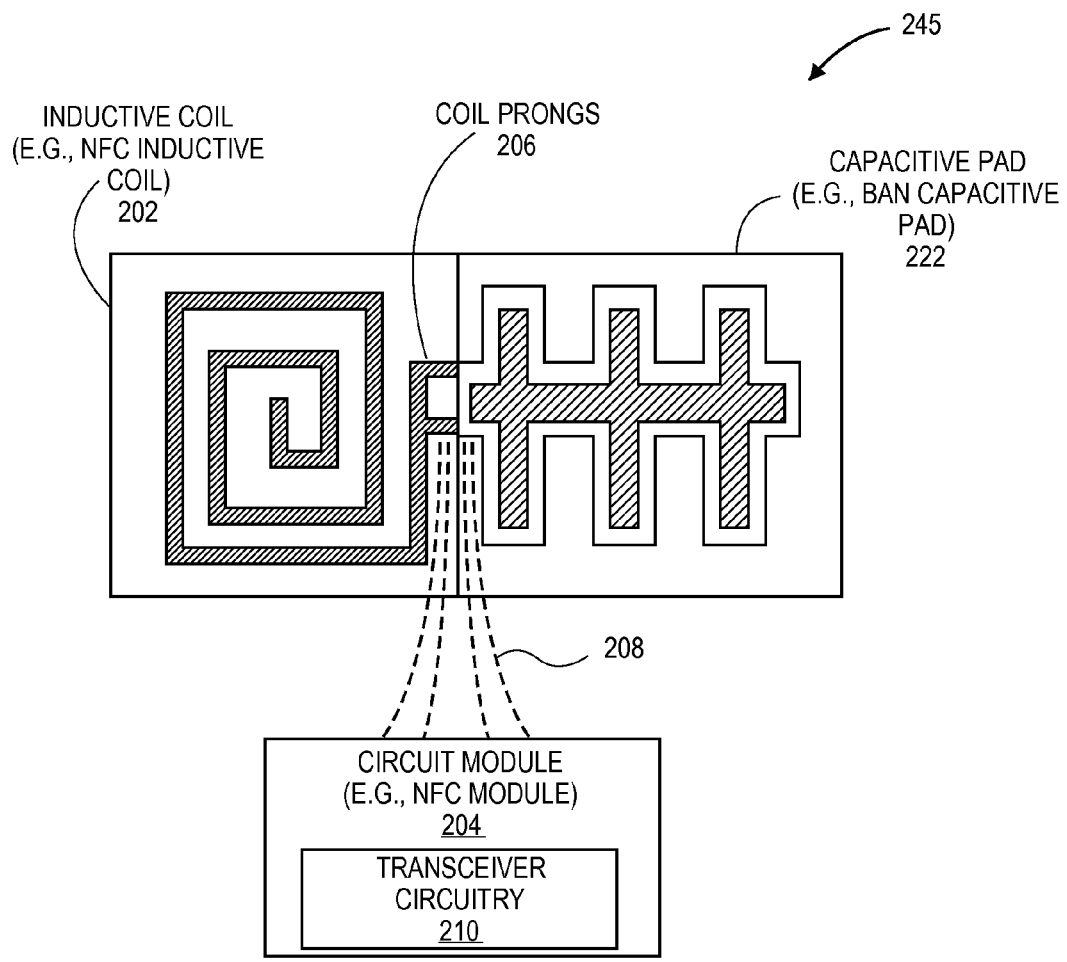
FIG. 2C illustrates a parallel coupling of an inductive coil and a capacitive pad within a hybrid communication circuitry of FIG. 2A according to one embodiment.

In one embodiment, conductive or capacitive pad 222 may be directly or indirectly connected with or coupled to inductive coil 202, such as via inductive coil prongs, such as coil prongs 206 of FIG. 2C, to facilitate private and seamless body-based near proximity communication between computing devices using human body as a communication channel while leveraging the pre-existing operating system, software and ecosystem support, and the security and mature silicon vendor base of NFC to implement BAN circuitry 220 with NFC circuitry 200. In one embodiment, having capacitive pad 222 on a computing device on either side of a communication link, such as on the receiving device as well as the transmitting device, facilitates a mutual capacitive pad-based communication between the transmitting and receiving devices, replacing the conventional mutual coupling of coils, such as inductive coil 202, for inductive coil-based communication. In one embodiment, the capacitive or conductive coupling between isolated capacitive pads, such as capacitive pad 222, employed on the computing device on either side of the communication link is used to facilitate communication, via human body, between receiver and transmitter of the computing devices on either side of the communication link.

In some embodiments, the aforementioned technique allows for NFC peer-to-peer communication between potentially wearable devices, such as smartphones, watches, rings, jewelry, etc., having embedded hybrid circuitry 112 on, for example, an NFC silicon, etc., and other computing devices, such as smartphones, tablet computers, laptop computers, convertible computers, desktop computers, etc., with mere proximity to skin, such as by touch, through clothing, etc., which may be sufficient to trigger a transfer or communication of data between these devices. For example, a user may use a hybrid circuitry-embedded watch to access her bank account on a laptop computer also having hybrid circuitry 112, use an embedded key to open a car lock, flash an embedded smartcard to a door panel to open a building door, etc.

Further, in one embodiment, inductive coils, such as inductive coil 202, are retained within NFC circuitry 200 so that additional degree of flexibility may be achieved by maintaining proximity-based NFC usage, while enabling the additional mode of body-based communication using capacitive coupling using capacitive pads, such as capacitive pad 222. Additionally, for example, a built-in polling mechanism (not shown) of NFC circuitry 200 may be retained for facilitating communication on relatively low power and having the ability to detect changes in loading and initiating transactions when, for example, two or more devices are touched simultaneously, eliminating the need for one of the sensors and its associated capacitive pad 222 (lowering the power needs); for example, in some embodiments, a touch sensor/sensing pad of a smartphone may be substituted to be used as a capacitive coupling pad.

In some embodiments, coil 202 may be used as a dedicated coil antenna for communication purposes and configured to operate on a separate resonant frequency (e.g., 13.56 MHz) and independent of any other antenna that may use standard frequencies in wireless communications, such as 5 GHz of Wi-Fi signals. Further, coil 202 may be made out of a printed circuit board (PCB), a flexible printed circuit (FPC), a metal wire, created through a laser direct structuring (LDS) process, or directly embedded to the metallic chassis (not shown) and underneath a conductive coating (not shown) of a computing device, such as computing device 100 of FIG. 1.

FIG. 2B illustrates a hybrid circuitry mechanism 110 according to one embodiment. In one embodiment, hybrid mechanism 110 may be employed at a device, such as computing device 100 of FIG. 1, such as laptop computers, desktop computers, smartphones, tablet computers, etc., and wearable devices, such as smartcards, watches, jewelry, key tags, etc. In one embodiment, hybrid mechanism 110 may include any number and type of components, such as reception logic 232, authentication logic 234, coupling logic 236, communications logic 238, and compatibility logic 240.

In one embodiment, coupling logic 236 of hybrid mechanism 110 is used to facilitate coupling of NFC circuitry 200 and BAN circuitry 220 as described with reference to FIG. 2B. For example and in one embodiment, coupling logic 236 is used to accept any new components, such as BAN capacitive pad 222 to be compatible with NFC inductive coil 202 and the rest of NFC circuitry 200. Further, in one embodiment, coupling logic 236 may be in communication with compatibility logic 240 and communication logic 238 to ensure that not only BAN capacitive pad 222 and NFC inductive coil 202 remain compatible and in communication with each other, but that the resulting hybrid circuitry 112 of FIG. 2A may remain compatible and in communication with various devices including computing devices, such as computing device 100 of FIG. 1 and computing devices 262, 264, 268 of FIG. 2E and other smart devices, such as wearable device 266 of FIG. 2E, etc., storage devices, databases, and/or data sources, networks, such cloud network, the Internet, intranet, cellular network, proximity or near proximity networks (e.g., near field communication (NFC) network, near-me area network (NAN), personal area network (PAN), Bluetooth, Bluetooth low energy (BLE), Bluetooth Smart, Wi-Fi proximity, Radio Frequency Identification (RFID), etc.), body area networks (e.g., body area network (BAN), wireless BAN (WBAN), body sensor network (BSN), etc.), connectivity and location management techniques (e.g., Common Connectivity Framework (CCF) by Intel®, etc.), software applications/websites, (e.g., social networking websites, such as Facebook®, LinkedIn®, Google+®, etc., business applications, games and other entertainment applications, etc.), programming languages, etc., while ensuring compatibility with changing technologies, parameters, protocols, standards, etc. Communication logic 238 may be arranged or configured to use any one or more of communication technologies, such as wireless or wired communications and relevant parameter, standards, protocols, etc., to facilitate hybrid and other communication.

Figure 2D:
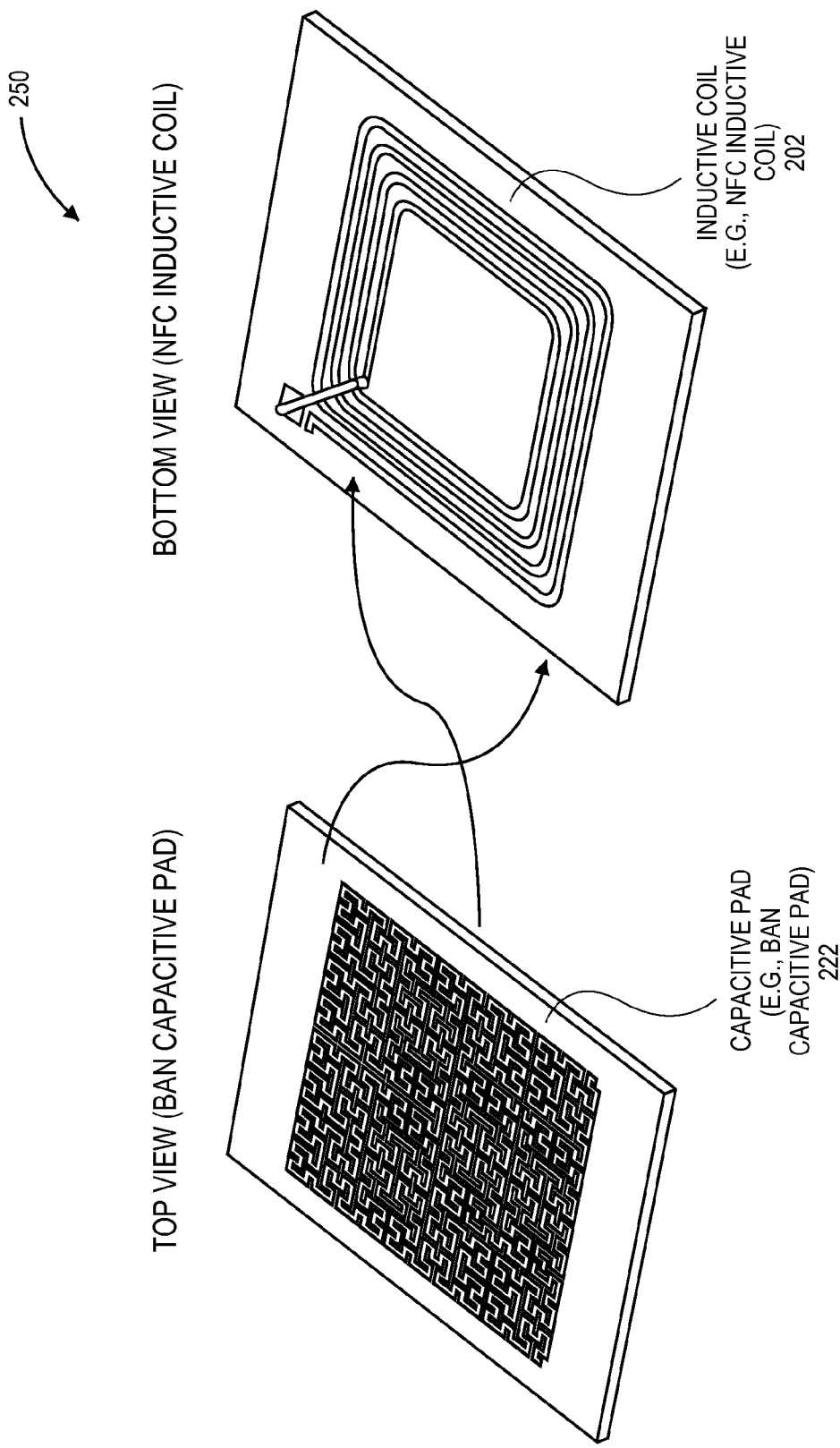
FIG. 2D illustrates a wraparound coupling of an inductive coil and a capacitive pad within a hybrid communication circuitry of FIG. 2A according to one embodiment.

In one embodiment, coupling logic 236 may facilitate any number and type of couplings between NFC inductive coil 202 and BAN capacitive pad 222, such as parallel coupling 245 of FIG. 2C or wraparound coupling 250 of FIG. 2D. It is contemplated, however, that parallel coupling 245 and wraparound coupling 250 are illustrated merely as examples and that embodiments are not limited to any particular type or form of coupling and that any number and type of couplings may be facilitated and/or modified as desired or necessitated. Once the coupling is established and hybrid circuitry 112 of FIG. 2A is established, reception logic 232 may be ready to receive requests for communication between devices. Upon receiving a request for communication (e.g., transfer data from device A to device B), the request may then be authorized by authorization logic 234.

In one embodiment, authorization logic 234 may authorize the devices requested to be involved in the transfer and reception of communication (e.g., device A and device B) and may further authorize one or more users involved in the transaction, such as user A and user B associated with device A and device B, respectively, or only user A if user A is associated with both devices. Given that hybrid communication between devices using hybrid circuitry 112 of FIG. 2A and hybrid mechanism 110 may involve one or more bodies, such as human body of user A and/or user B, as a communication channel, in some embodiments, this authorization process may be not be required at all or performed quickly and without requiring any additional and/or conventional identifications (e.g., password, facial features, fingerprints, etc.) because the hybrid communication using a body as a communication channel (as opposed to the air) may be secure, confidential, and private. Upon authentication (if necessary), communication logic 238 may facilitate the requested communication between the devices, such as device A and device B.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, such as "near field communication", "NFC", "body area network", "BAN", "hybrid", "proximity", etc., should not be read to limit embodiments to software or devices that carry that label in products or in literature external to this document.

It is contemplated that any number and type of components may be added to and/or removed from hybrid circuitry 112 of FIG. 2A and/or hybrid mechanism 110 to facilitate various embodiments including adding, removing, and/or enhancing certain features. For brevity, clarity, and ease of understanding of hybrid circuitry 112 of FIG. 2A and/or hybrid mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 2C illustrates a parallel coupling 245 of an NFC inductive coil 202 and a BAN capacitive pad 222 within a hybrid communication circuitry 112 of FIG. 2A according to one embodiment. In the embodiment, capacitive pad 222 is implemented on the same substrate as inductive coil 202 causing the resonance of capacitive pad 222 to be, for example, NFC's 13.56 MHz where the energy transfer may occur through linkage on electric fields. In the illustrated combination or coupling of capacitive pad 222 and inductive coil 202 is done in parallel via coil prongs 206 of inductive coil 202 and in turn connected to NFC circuit module 204. The illustrated dotted lines between coil prongs 206 and circuit module 204 indicate traces 208 on the bottom side of a PCB employing hybrid circuitry 112 of FIG. 2A. As aforementioned, transceiver circuitry 210 may include one or more transmitters and receivers for transmitting data and receiving data, respectively.

FIG. 2D illustrates a wraparound coupling 250 of an NFC inductive coil 202 and a BAN capacitive pad 222 within a hybrid communication circuitry 112 of FIG. 2A according to one embodiment. To avoid consuming any additional space that may be needed for adding another component, such as capacitive pad 222, in some embodiments, inductive coil 202 and capacitive pad 222 may be coupled with each other in a wraparound form 250 where capacitive pad 222 may be placed on top of inductive coil 202 to form a single module or device. Further, in one embodiment, capacitive pad 222 may include a fractal capacitor to maximize the perimeter of the coupling pad electrode surface and increase the lateral capacitance between coplanar electrodes compared to a simple capacitor or an interdigital capacitor. It is contemplated that capacitive pad 222 may also be realized by using or reusing a touchpanel or a touchpad surface of a computing device. Further, using a fractal capacitor as capacitive pad 222 offers a special property that it does not have self-loops, which prevents or significantly lessens the formation of Eddy loops on the capacitive surface of the capacitor pad 222, allowing magnetic field to pass through.

By wrapping the surfaces of inductive coil 202 and fractal capacitive pad 222, such as inductive coil 202 being placed underneath capacitive pad 222, a single module/device having a compact structure is realized that can become part of any number and type of devices, particular smaller devices, such as an smartphone, a tablet computer, an Ultrabook, a convertible chassis, etc., or any conductive chassis, while simultaneously providing the dual functionalities NFC and BAN. For example and as illustrated, capacitive pad 222 may include a fractal capacitive coupling pad for BAN (left, top) which may then be connected with NFC inductive coil 202 (right, bottom) to provide inductive coupling for this wraparound coupling 250. For example and in one embodiment, the single module formed by wraparound coupling 250 provides a fractal capacitive coupling pad to serve as BAN capacitive pad 222 representing the top side or portion of the single module, while the bottom side or portion of the single module is represented by NFC inductive coil 202. It is contemplated that terms like "top" and "bottom" are merely used here as examples to represent the two sides of the single module and that they may be reversed as "bottom" and "top" or referenced as "sides" of the single module, etc.

As aforementioned, this efficient, compact, and space-saving single module-based hybrid circuitry 110 may be used within a mobile/portable computing device chassis, such as on the keypad area (also referred to as "palmrest area") of a laptop computer or on the back over of a tablet computer. Further, the fractal surface of capacitive pad 222 may also function as an Eddy loop free pass through the surface the magnetic field originating from inductive coil 222. For example, the single module may be placed or integrated anywhere within the keypad area of a portable device (e.g., laptop computer), such as next to a trackpad (also referred to as "touchpad" or "touchpanel") of a laptop computer.

Figure 2E:
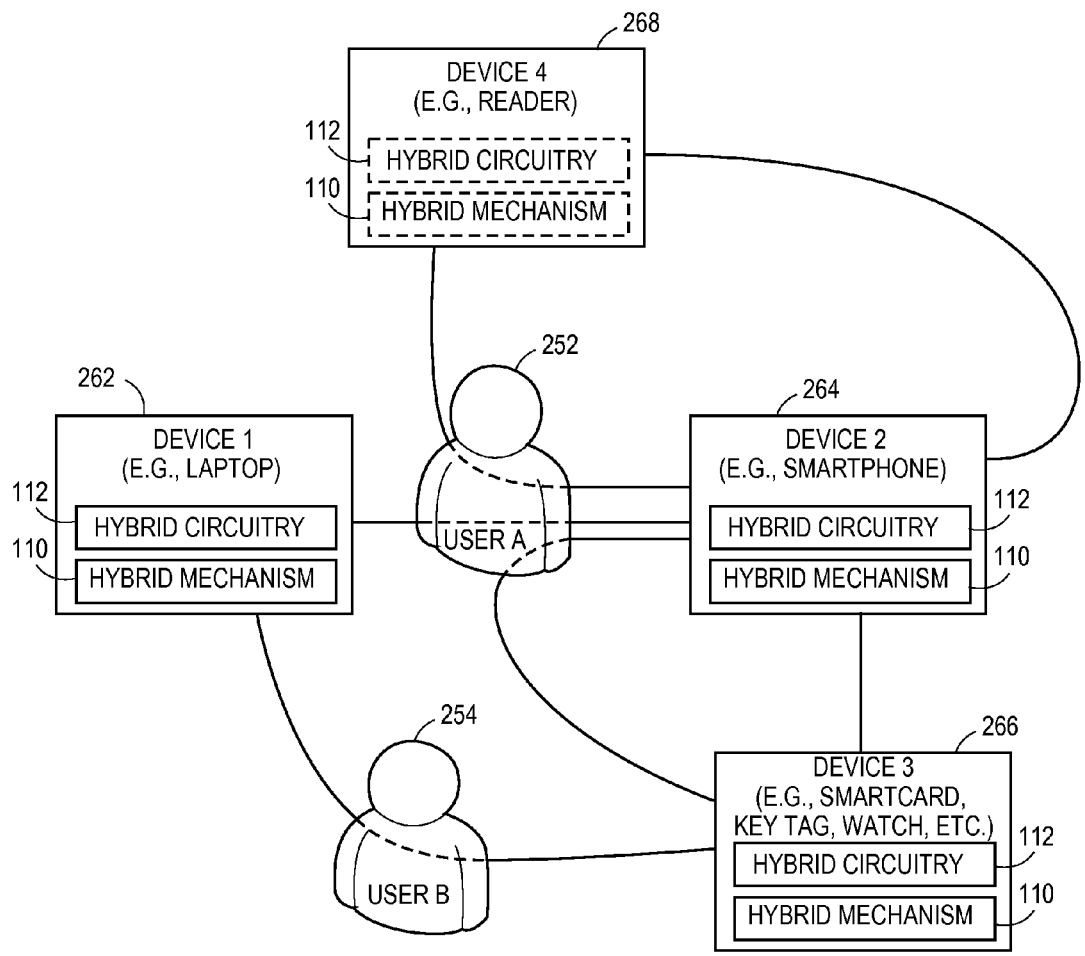
FIG. 2E illustrates proximity/body-based hybrid communication between multiple devices using a hybrid communication circuitry of FIG. 2A and a hybrid communication mechanism of FIG. 2B according to one embodiment.

FIG. 2E illustrates proximity/body-based hybrid communication between multiple devices 262-268 using a hybrid communication circuitry 112 of FIG. 2A and a hybrid communication mechanism 110 of FIG. 2B according to one embodiment. In the illustrated embodiment, user A 252 is associated with devices 1 262 and 2 264, where user B 254 is associated with devices 1 262 and device 3 266. Each of devices 1-3 262-266 may employ hybrid circuitry 112. Device 4 268, on the other hand, may be a public device, such as a reader (e.g., boarding pass reader at an airport, ticket reader at a train station, credit card reader at a parking lot, security door panel outside a building, car lock, etc.), which may or may not have employed hybrid circuitry 112. It is contemplated that each of devices 1-4 262-268 may be the same or similar as or include any number and type of components of computing device 100 of FIG. 1 hosting hybrid circuitry 112. Further, for example, both user A 252 (e.g., spouse, sibling, friend, neighbor, etc.) and user B 254 (e.g., spouse, sibling, friend, neighbor, etc.) may have access to device 1 262 which may be, for example, a laptop computer. Now, for example, user A 252 may have access to another personal device, such as device 2 264, which may include, for example, a smartphone. Similarly, user B 254 may have access to a personal device, such as device 3 266, which may include a smart card (e.g., common access card (CAC), radio frequency identification (RFID) card, etc.), a watch, a piece of jewelry, a key tag, any device tagged or embedded with hybrid circuitry 112, etc.).

Now, for example, user A 252 may have his device 2 264 in his pocket within proximity of device 1 262 to communicate with device 1 262, via his body 252, to, for example, access bank account information on device 1 262. This constitutes a secure and private network through the body of user A 252 which serves as a communication medium or channel as opposed to other proximity networks (e.g., Bluetooth) that use less-secure and less-private communication mediums or channels, such as the air, in case of other regular proximity networks, such as Bluetooth. For example, device 2 264 may include user credentials (e.g., user profile, user identification information, authentication/access codes, bank account numbers, etc.) corresponding to user A 252 to allow user A 252 to access bank account information on device 1 262 through device 2 264.

In one embodiment, since both device 1 262 and device 2 264 include hybrid circuitry 112, any communication, including transfer of data, between the two devices 1-2 262-264 may be performed via the body of user A 252. In using hybrid circuitry 112 to facilitate the body of user A 252 as a communication channel, in one embodiment, any device credentials associated with device 2 264 and user credentials associated with user A 252 may be automatically and dynamically transferred to and authenticated at device 1 262 to authenticate and allow user A 252 to access the bank account at device 1 262 without having to require user A 252 to provide any other or additional forms of identification (e.g., password, challenge question, facial features captured through camera, etc.). This is because using the body as a communication channel, as facilitated by hybrid circuitry 112, a secure and private network created between the two communicating devices, such as device 1 262 and device 2 64. This reliance of a keyfob also allows for the authentication credentials to be revoked or changed in case of a theft or suspension of compromise. Further, the credentials may again be revoked by bringing the keyfob close to a designated device, such as a card reader, that can reprogram the keyfob either over BAN or NFC depending on the device/card reader's capabilities.

Furthermore, in one embodiment, having employed the dual functionalities of NFC and BAN and using the body as a communication channel, via hybrid circuitry 112, allows user A 252 to choose to leave device 2 264 on this body, such as in his coat pocket or backpack, etc., as opposed to having to take device 1 262 out and/or bring it within certain proximate range of device 2 264 as may be required by conventional proximity networks that lack the dual functionalities of NFC and BAN.

Continuing with the back account example, now, for example, user A 252 has to go to the airport to catch and flight and he asks user B 254 to continue accessing the bank account information on device 1 262, user A 252 may choose to transfer his credentials to user B 254, such as from device 2 264 to device 3 266. In one embodiment, having hybrid circuitry 112 on both device 2 264 and device 3 266, these confidential credentials associated with user A 252 may be transferred over to device 3 266 via hybrid circuitry 112 and using the body of user A 252 as a secure communication channel. In some embodiments, the body of user B 254 may also be used as a communication channel in the transfer process. Further, for example, in some embodiments, the two devices 2-3 264-266 at the ends of the communication link may be brought close together (e.g., within ~5 mm) to achieve proximity-based communication by having users A 252 and B 254 touch capacitive pads, such as capacitive pad 202 of FIG. 2A, on their corresponding devices 2 264 and 3 266, respectively, at their respective ends. This technique may be particularly useful to transfer credentials that may not be confidential or of high importance, such as gaming credentials, access to family photos, etc.

Given the importance, sensitivity, and confidential nature of the back account-related credentials, such credentials may be transferred based on a predetermined criteria. For example, user A 252 and/or user B 254 may decide that each time such credentials are transferred, they will be allowed to be used for any one or more of over a given period of time (e.g., 30 minutes, two days, etc.), within a geographic location (e.g., within a particular zip code, only when at the house, etc.), via a particular network (e.g., home Wi-Fi account-related service set identification (SSID), etc.), etc., and that the credentials would automatically expire at the end of or upon violating any of the predetermined criteria (e.g., end of the assigned time period, leaving the home Wi-Fi network, etc.). This may be achieved using any number of techniques, such as geo-fencing, assigning the home Wi-Fi network code to the credentials so the access is automatically terminated upon leaving the home network, adding a time period to the credentials, etc. It is contemplated that the restrictive nature of these predetermined criteria may be based on any number and type of factors, such as sensitivity of the credentials or data being transferred, user preference, device capacity, network capacity, connection quality, physical location, urgency or emergency, etc. Further, these predetermined criteria may be customized by person, relationship, location, devices, etc. For example, user A 252 may choose to set one set of criteria for user B 254 but a completely different set of criteria for another user.

Continuing with the bank account example, once the credentials are transferred over to device 3 266, user B 254 may access the bank account on device 1 262 using, in one embodiment, hybrid circuitry 112 and her body as a communication channel. In some embodiments, device 3 266 may be an embedded smart device, such as a smart card, a watch, a piece of jewelry, a key tag, etc., which, as with user A 252, user B 254 may choose to leave on her body, such as in her pocket, inside the purse, etc., and continue to seamlessly use and access device 1 262 using her body as a communication channel. As aforementioned, upon reaching a term (e.g., expiration of the predetermined time period) or violating a term (e.g., exiting the home network), the transferred credentials on device 3 266 may automatically expire.

Meanwhile, user A 252 reaches the airport and uses device 4 268 (e.g., boarding pass reader) to read his boarding pass so he may board the flight. In some embodiments, if device 4 268 lacks hybrid circuitry 112, user A 252 may simply place device 2 264 within an acceptable proximity (e.g., within ~5 mm) of device 4 268 to reach the electronic boarding pass being displayed on device 2 264. In other embodiments, if device 4 268 employs hybrid circuitry 112, user A 252 may not have to take out device 2 264 from his pocket and electronic boarding pass on device 2 264 may be automatically communicated (e.g., the boarding pass image is automatically transferred) to device 4 268 via the body of user A 252 serving as a communication channel. As with the credential transfer described above, in one embodiment, the boarding pass transfer (or any other transfer of data, such as signing a contract on a device 1-4 262-268, playing a game on a single or multiple devices 1-4 262-268, transferring contact information or photos or videos, etc., between devices 1-4 262-268, accessing a device 1-4 262-268 representing a car lock panel or a door lock panel to enter a car or a building, respectively, etc.) may be performed in security and privacy without having user A 252 to provide any other form of user or device identification because using the body via hybrid circuitry 112 creates a secure and private network that provide automatic identification and authentication of users, such as user A 252, and devices, such as device 2 264.

Moreover, in some embodiments, using the power-by-field mode of NFC, any communication (e.g., accessing account information, transferring credentials, reading boarding pass, etc.) between devices 1-4 262-264 may be made even if the battery of one of the devices, such as device 2 264, may be low on power or even dead, because by using the power field mode of NFC provided through NFC circuitry 200 of FIG. 2A, the dead or low-powered device 2 264 may continue to receive sufficient power from the other communicating device, such as device 1 262, to seamlessly continue to perform their tasks and transactions.

Figure 3:
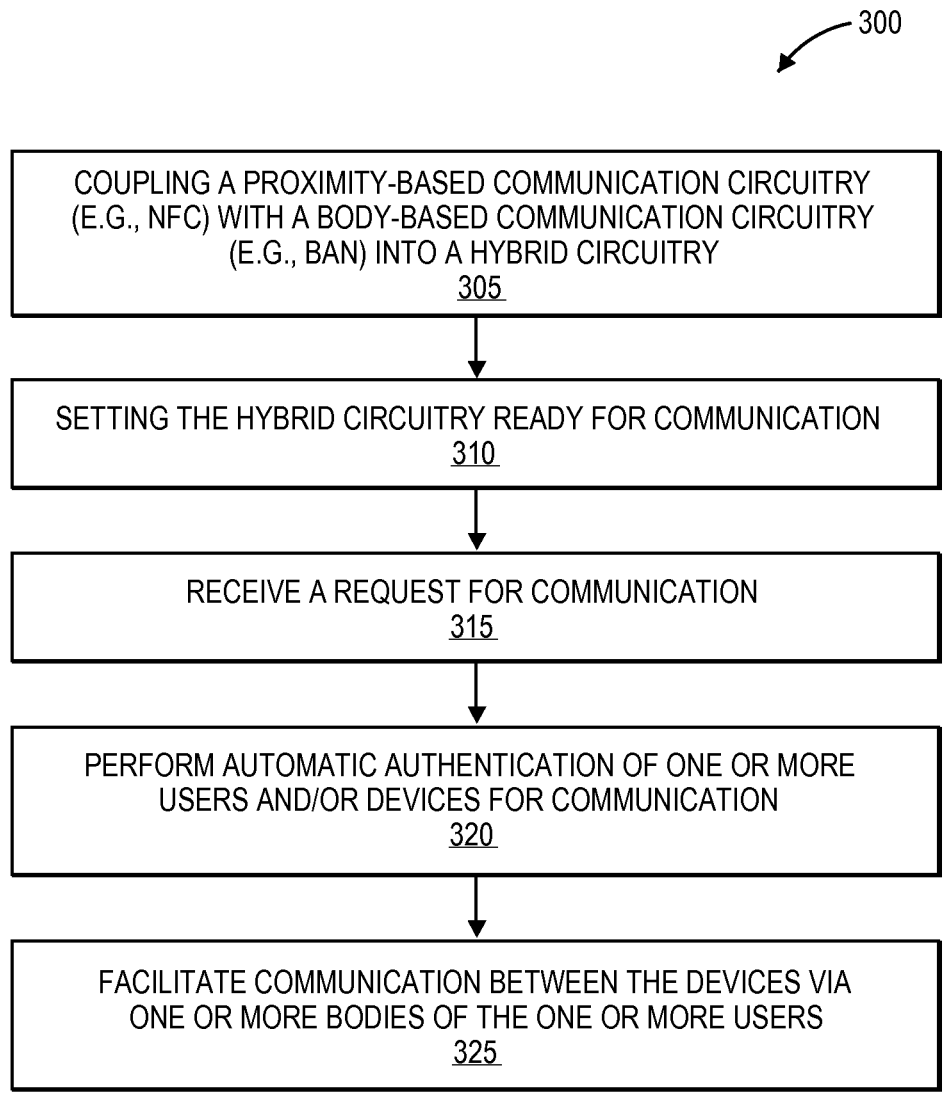
FIG. 3 illustrates a method for facilitating hybrid communication between devices according to one embodiment.

FIG. 3 illustrates a method 300 for facilitating hybrid communication between devices according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by hybrid communication mechanism 110 and/or hybrid communication circuitry 112 of FIG. 1.

For brevity and clarity, many of the details discussed with reference to FIGS. 2A-2E are not discussed or repeated here. Method 300 begins at processing block 305 with coupling an inductive coil (e.g., NFC inductive coil) of a proximity-based communication circuitry (e.g., NFC circuitry) and a capacitive pad (e.g., BAN capacitive pad) of a body-based communication circuitry (e.g., BAN circuitry) into forming a hybrid communication circuitry for facilitating body/proximity-based hybrid communication between devices. At block 310, the hybrid circuitry is set up to be used for facilitating hybrid communication between devices. At block 315, a request for hybrid communication is received from a first device and/or a second device. At block 320, any necessary authentication of the first and/or second devices and/or one or more users associated with the first and/or second devices is performed. At block 325, body/proximity-based hybrid communication between the first device and the second device is facilitated and performed via the hybrid circuitry and using one or more bodies of the first and/or second users as one or more communication channels between the first and second devices.

Figure 4:
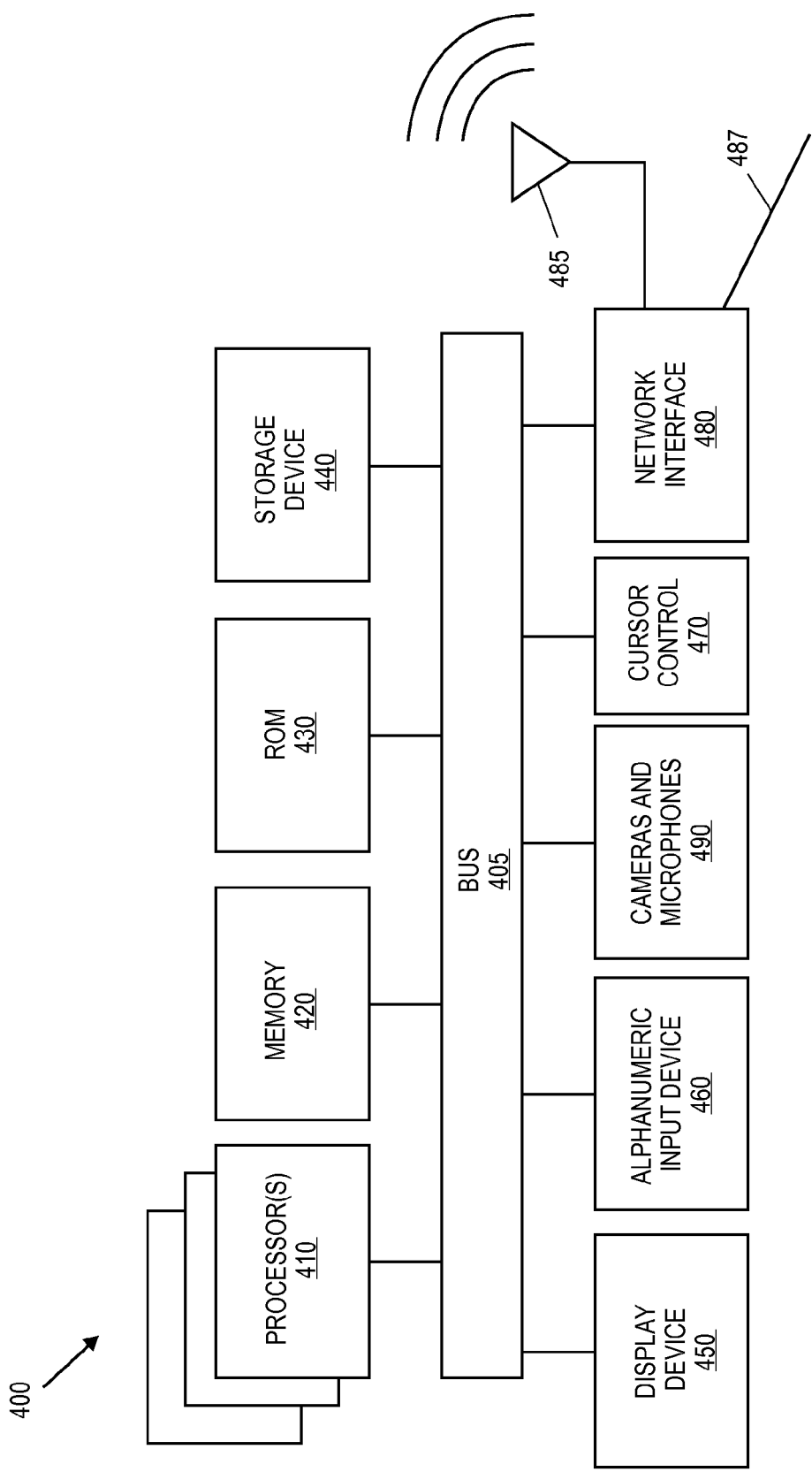
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100 of FIG. 1 and/or one or more devices 262-268 of FIG. 2E.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate hybrid communication, comprising: a near proximity circuitry coupled to a processor further coupled to a memory, the near proximity circuitry including an inductive coil; and a capacitive pad of a body area circuitry, wherein the capacitive pad is coupled to the inductive coil to form a hybrid circuitry to facilitate the hybrid communication.

Example 2 includes the subject matter of Example 1, wherein the near proximity circuitry comprises a near field communication (NFC) circuitry.

Example 3 includes the subject matter of Example 1, wherein the body area circuitry comprises a body area network (BAN) circuitry Example 4 includes the subject matter of Example 1, wherein the coupling of the capacitive pad and the inductive coil comprises a parallel coupling and a wraparound coupling, wherein the wraparound coupling includes a single component having the capacitive pad on a first side of the component and the inductive coil on a second side of the component, wherein the first side includes a top side of the component, and a second side includes a bottom side of the component.

Example 5 includes the subject matter of Example 1, wherein the hybrid communication is facilitated between a first device and a second device via one or more bodies as facilitated by the capacitive pad, wherein the one or more bodies include one or more human bodies of one or more users associated with the first device or the second device, wherein the one or more bodies serve as one or more communication channels for the hybrid communication.

Example 6 includes the subject matter of Example 5, wherein the first and second devices comprise one or more computing devices or one or more smart wearable devices, wherein the one or more computing devices comprise mobile computing devices including one or more of a laptop computer, a smartphone, and a tablet computer, and wherein the one or more smart wearable devices comprise a smartcard, a key pad, a watch, and a piece of jewelry.

Example 7 includes the subject matter of Example 1, wherein the hybrid circuitry is integrated within a chassis of the apparatus, wherein the chassis includes a metal chassis, wherein the NFC circuitry further includes a circuit module to facilitate tuning to the inductive coil for maximum power transfer during the hybrid communication, wherein the hybrid communication includes receiving or transmitting of data, via the one or more bodies, between the first and second devices.

Example 8 includes an apparatus to facilitate hybrid communication, comprising: coupling logic to couple an inductive coil of a near proximity circuitry with a capacitive pad of a body area circuitry to form a hybrid circuitry; and communication logic to facilitate the hybrid communication between a plurality of devices.

Example 9 includes the subject matter of Example 8, wherein the near proximity circuitry comprises a near field communication (NFC) circuitry.

Example 10 includes the subject matter of Example 8, wherein the body area circuitry comprises a body area network (BAN) circuitry.

Example 11 includes the subject matter of Example 8, further comprising: reception logic to receive a request for facilitating the hybrid communication between a first device and a second device of the plurality of devices; and authentication logic to authenticate the first device or the second device, wherein the authentication logic is further to authenticate a first user or a second user associated with the first device and the second device, respectively.

Example 12 includes the subject matter of Example 8, wherein the hybrid communication is facilitated between the first device and the second device via a first body of the first user or a second body of the second user, wherein the first and second bodies serve as one or more communication channels.

Example 13 includes a method for facilitating hybrid communication, comprising: coupling an inductive coil of a near proximity circuitry with a capacitive pad of a body area circuitry to form a hybrid circuitry; and facilitating, via the hybrid circuitry, the hybrid communication between a plurality of devices.

Example 14 includes the subject matter of Example 13, wherein the near proximity circuitry comprises a near field communication (NFC) circuitry.

Example 15 includes the subject matter of Example 13, wherein the body area circuitry comprises a body area network (BAN) circuitry.

Example 16 includes the subject matter of Example 13, wherein the coupling of the capacitive pad and the inductive coil comprises a parallel coupling and a wraparound coupling, wherein the wraparound coupling includes a single component having the capacitive pad on a first side of the component and the inductive coil on a second side of the component, wherein the first side includes a top side of the component, and a second side includes a bottom side of the component.

Example 17 includes the subject matter of Example 13, wherein the hybrid communication is facilitated between a first device and a second device via one or more bodies as facilitated by the capacitive pad, wherein the one or more bodies include one or more human bodies of one or more users associated with the first device or the second device, wherein the one or more bodies serve as one or more communication channels for the hybrid communication.

Example 18 includes the subject matter of Example 17, wherein the first and second devices comprise one or more computing devices or one or more smart wearable devices, wherein the one or more computing devices comprise mobile computing devices including one or more of a laptop computer, a smartphone, and a tablet computer, and wherein the one or more smart wearable devices comprise a smartcard, a key pad, a watch, and a piece of jewelry.

Example 19 includes the subject matter of Example 13, further comprising integrating the hybrid circuitry within a chassis of the apparatus, wherein the chassis includes a metal chassis, wherein the NFC circuitry further includes a circuit module to facilitate tuning to the inductive coil for maximum power transfer during the hybrid communication, wherein the hybrid communication includes receiving or transmitting of data, via the one or more bodies, between the first and second devices.

Example 20 includes the subject matter of Example 13, further comprising: receiving a request for facilitating the hybrid communication between the first device and the second device; and authenticating the first device or the second device, wherein authenticating further comprises authenticating the one or more users associated with the first device or the second device.

Example 21 includes at least one machine-readable medium comprising a plurality of instructions that in response to being executed on a computing device, causes the computing device to carry out operations according to any one of the aforementioned examples 13 to 20.

Example 22 includes at least one non-transitory or tangible machine-readable medium comprising a plurality of instructions that in response to being executed on a computing device, causes the computing device to carry out operations according to any one of the aforementioned examples 13 to 20.

Example 23 includes a system comprising a mechanism to carry out operations according to any one of the aforementioned examples 13 to 20.

Example 24 includes an apparatus comprising means to carry out operations according to any one of the aforementioned examples 13 to 20.

Example 25 includes a computing device arranged to carry out operations according to any one of the aforementioned examples 13 to 20.

Example 26 includes a communications device arranged to carry out operations according to any one of the aforementioned examples 13 to 20.

Example 27 includes a system comprising a storage device having instructions, and a processor to execute the instructions to facilitate a mechanism to perform one or more operations, wherein the system further comprises: a near proximity circuitry coupled to a processor further coupled to a memory, the near proximity circuitry including an inductive coil; and a capacitive pad of a body area circuitry, wherein the capacitive pad is coupled to the inductive coil to form a hybrid circuitry to facilitate the hybrid communication.

Example 28 includes the subject matter of Example 27, wherein the near proximity circuitry comprises a near field communication (NFC) circuitry.

Example 29 includes the subject matter of Example 27, wherein the body area circuitry comprises a body area network (BAN) circuitry Example 30 includes the subject matter of Example 27, wherein the coupling of the capacitive pad and the inductive coil comprises a parallel coupling and a wraparound coupling, wherein the wraparound coupling includes a single component having the capacitive pad on a first side of the component and the inductive coil on a second side of the component, wherein the first side includes a top side of the component, and a second side includes a bottom side of the component.

Example 31 includes the subject matter of Example 27, wherein the hybrid communication is facilitated between a first device and a second device via one or more bodies as facilitated by the capacitive pad, wherein the one or more bodies include one or more human bodies of one or more users associated with the first device or the second device, wherein the one or more bodies serve as one or more communication channels for the hybrid communication.

Example 32 includes the subject matter of Example 31, wherein the first and second devices comprise one or more computing devices or one or more smart wearable devices, wherein the one or more computing devices comprise mobile computing devices including one or more of a laptop computer, a smartphone, and a tablet computer, and wherein the one or more smart wearable devices comprise a smartcard, a key pad, a watch, and a piece of jewelry.

Example 33 includes the subject matter of Example 27, wherein the hybrid circuitry is integrated within a chassis of the apparatus, wherein the chassis includes a metal chassis, wherein the NFC circuitry further includes a circuit module to facilitate tuning to the inductive coil for maximum power transfer during the hybrid communication, wherein the hybrid communication includes receiving or transmitting of data, via the one or more bodies, between the first and second devices.

Example 34 includes a system comprising a storage device having instructions, and a processor to execute the instructions to facilitate a mechanism to perform one or more operations comprising: coupling an inductive coil of a near proximity circuitry with a capacitive pad of a body area circuitry to form a hybrid circuitry; and facilitating, via the hybrid circuitry, the hybrid communication between a plurality of devices.

Example 35 includes the subject matter of Example 34, wherein the near proximity circuitry comprises a near field communication (NFC) circuitry.

Example 36 includes the subject matter of Example 34, wherein the body area circuitry comprises a body area network (BAN) circuitry.

Example 37 includes the subject matter of Example 34, wherein the coupling of the capacitive pad and the inductive coil comprises a parallel coupling and a wraparound coupling, wherein the wraparound coupling includes a single component having the capacitive pad on a first side of the component and the inductive coil on a second side of the component, wherein the first side includes a top side of the component, and a second side includes a bottom side of the component.

Example 38 includes the subject matter of Example 34, wherein the hybrid communication is facilitated between a first device and a second device via one or more bodies as facilitated by the capacitive pad, wherein the one or more bodies include one or more human bodies of one or more users associated with the first device or the second device, wherein the one or more bodies serve as one or more communication channels for the hybrid communication.

Example 39 includes the subject matter of Example 38, wherein the first and second devices comprise one or more computing devices or one or more smart wearable devices, wherein the one or more computing devices comprise mobile computing devices including one or more of a laptop computer, a smartphone, and a tablet computer, and wherein the one or more smart wearable devices comprise a smartcard, a key pad, a watch, and a piece of jewelry.

Example 40 includes the subject matter of Example 34, wherein the one or more operations further comprise integrating the hybrid circuitry within a chassis of the apparatus, wherein the chassis includes a metal chassis, wherein the NFC circuitry further includes a circuit module to facilitate tuning to the inductive coil for maximum power transfer during the hybrid communication, wherein the hybrid communication includes receiving or transmitting of data, via the one or more bodies, between the first and second devices.

Example 41 includes the subject matter of Example 34, wherein the one or more operations further comprise: receiving a request for facilitating the hybrid communication between the first device and the second device; and authenticating the first device or the second device, wherein authenticating further comprises authenticating the one or more users associated with the first device or the second device.

Example 42 includes an apparatus comprising: means for coupling an inductive coil of a near proximity circuitry with a capacitive pad of a body area circuitry to form a hybrid circuitry; and means for facilitating, via the hybrid circuitry, the hybrid communication between a plurality of devices.

Example 43 includes the subject matter of Example 42, wherein the near proximity circuitry comprises a near field communication (NFC) circuitry.

Example 44 includes the subject matter of Example 42, wherein the body area circuitry comprises a body area network (BAN) circuitry.

Example 45 includes the subject matter of Example 42, wherein the coupling of the capacitive pad and the inductive coil comprises a parallel coupling and a wraparound coupling, wherein the wraparound coupling includes a single component having the capacitive pad on a first side of the component and the inductive coil on a second side of the component, wherein the first side includes a top side of the component, and a second side includes a bottom side of the component.

Example 46 includes the subject matter of Example 42, wherein the hybrid communication is facilitated between a first device and a second device via one or more bodies as facilitated by the capacitive pad, wherein the one or more bodies include one or more human bodies of one or more users associated with the first device or the second device, wherein the one or more bodies serve as one or more communication channels for the hybrid communication.

Example 47 includes the subject matter of Example 46, wherein the first and second devices comprise one or more computing devices or one or more smart wearable devices, wherein the one or more computing devices comprise mobile computing devices including one or more of a laptop computer, a smartphone, and a tablet computer, and wherein the one or more smart wearable devices comprise a smartcard, a key pad, a watch, and a piece of jewelry.

Example 48 includes the subject matter of Example 42, further comprising means for integrating the hybrid circuitry within a chassis of the apparatus, wherein the chassis includes a metal chassis, wherein the NFC circuitry further includes a circuit module to facilitate tuning to the inductive coil for maximum power transfer during the hybrid communication, wherein the hybrid communication includes receiving or transmitting of data, via the one or more bodies, between the first and second devices.

Example 49 includes the subject matter of Example 42, further comprising: means for receiving a request for facilitating the hybrid communication between the first device and the second device; and means for authenticating the first device or the second device, wherein authenticating further comprises authenticating the one or more users associated with the first device or the second device.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   a near proximity circuitry coupled to a processor further coupled to a memory, the near proximity circuitry including an inductive coil; and
   a capacitive pad of a body area circuitry, wherein the capacitive pad is coupled to the inductive coil to form a hybrid circuitry to facilitate the hybrid communication, wherein the coupling of the capacitive pad and the inductive coil comprises a parallel coupling and a wraparound coupling, wherein the wraparound coupling includes a single component having the capacitive pad on a first side of the component and the inductive coil on a second side of the component, wherein the first side includes a top side of the component, and a second side includes a bottom side of the component.

2. The apparatus of claim 1, wherein the near proximity circuitry comprises a near field communication (NFC) circuitry.

3. The apparatus of claim 1, wherein the body area circuitry comprises a body area network (BAN) circuitry.

4. The apparatus of claim 1, wherein the hybrid communication is facilitated between a first device and a second device via one or more bodies as facilitated by the capacitive pad, wherein the one or more bodies include one or more human bodies of one or more users associated with the first device or the second device, wherein the one or more bodies serve as one or more communication channels for the hybrid communication.

5. The apparatus of claim 4, wherein the first and second devices comprise one or more computing devices or one or more smart wearable devices, wherein the one or more computing devices comprise mobile computing devices including one or more of a laptop computer, a smartphone, and a tablet computer, and wherein the one or more smart wearable devices comprise a smartcard, a key pad, a watch, and a piece of jewelry.

6. The apparatus of claim 1, wherein the hybrid circuitry is integrated within a chassis of the apparatus, wherein the chassis includes a metal chassis, wherein the NFC circuitry further includes a circuit module to facilitate tuning to the inductive coil for maximum power transfer during the hybrid communication, wherein the hybrid communication includes receiving or transmitting of data, via the one or more bodies, between the first and second devices.

7. A method comprising:
   coupling an inductive coil of a near proximity circuitry with a capacitive pad of a body area circuitry to form a hybrid circuitry; and
   facilitating, via the hybrid circuitry, the hybrid communication between a plurality of devices, wherein the coupling of the capacitive pad and the inductive coil comprises a parallel coupling and a wraparound coupling, wherein the wraparound coupling includes a single component having the capacitive pad on a first side of the component and the inductive coil on a second side of the component, wherein the first side includes a top side of the component, and a second side includes a bottom side of the component.

8. The method of claim 7, wherein the near proximity circuitry comprises a near field communication (NFC) circuitry.

9. The method of claim 7, wherein the body area circuitry comprises a body area network (BAN) circuitry.

10. The method of claim 7, wherein the hybrid communication is facilitated between a first device and a second device via one or more bodies as facilitated by the capacitive pad, wherein the one or more bodies include one or more human bodies of one or more users associated with the first device or the second device, wherein the one or more bodies serve as one or more communication channels for the hybrid communication.

11. The method of claim 10, wherein the first and second devices comprise one or more computing devices or one or more smart wearable devices, wherein the one or more computing devices comprise mobile computing devices including one or more of a laptop computer, a smartphone, and a tablet computer, and wherein the one or more smart wearable devices comprise a smartcard, a key pad, a watch, and a piece of jewelry.

12. The method of claim 7, further comprising integrating the hybrid circuitry within a chassis of the apparatus, wherein the chassis includes a metal chassis, wherein the NFC circuitry further includes a circuit module to facilitate tuning to the inductive coil for maximum power transfer during the hybrid communication, wherein the hybrid communication includes receiving or transmitting of data, via the one or more bodies, between the first and second devices.

13. The method of claim 7, further comprising:
receiving a request for facilitating the hybrid communication between the first device and the second device; and
authenticating the first device or the second device, wherein authenticating further comprises authenticating the one or more users associated with the first device or the second device.

14. At least one non-transitory machine-readable medium comprising a plurality of instructions that in response to being executed on a computing device, causes the computing device to carry out one or more operations comprising:
coupling an inductive coil of a near proximity circuitry with a capacitive pad of a body area circuitry to form a hybrid circuitry; and
facilitating, via the hybrid circuitry, the hybrid communication between a plurality of devices, wherein the coupling of the capacitive pad and the inductive coil comprises a parallel coupling and a wraparound coupling, wherein the wraparound coupling includes a single component having the capacitive pad on a first side of the component and the inductive coil on a second side of the component, wherein the first side includes a top side of the component, and a second side includes a bottom side of the component.

15. The non-transitory machine-readable medium of claim 14, wherein the near proximity circuitry comprises a near field communication (NFC) circuitry, wherein the body area circuitry comprises a body area network (BAN) circuitry.

16. The non-transitory machine-readable medium of claim 14, wherein the hybrid communication is facilitated between a first device and a second device via one or more bodies as facilitated by the capacitive pad, wherein the one or more bodies include one or more human bodies of one or more users associated with the first device or the second device, wherein the one or more bodies serve as one or more communication channels for the hybrid communication, and
wherein the first and second devices comprise one or more computing devices or one or more smart wearable devices, wherein the one or more computing devices comprise mobile computing devices including one or more of a laptop computer, a smartphone, and a tablet computer, and wherein the one or more smart wearable devices comprise a smartcard, a key pad, a watch, and a piece of jewelry.

17. The non-transitory machine-readable medium of claim 14, wherein the one or more operations comprise integrating the hybrid circuitry within a chassis of the apparatus, wherein the chassis includes a metal chassis, wherein the NFC circuitry further includes a circuit module to facilitate tuning to the inductive coil for maximum power transfer during the hybrid communication, wherein the hybrid communication includes receiving or transmitting of data, via the one or more bodies, between the first and second devices.

18. The non-transitory machine-readable medium of claim 14, wherein the one or more operations comprise:
receiving a request for facilitating the hybrid communication between the first device and the second device; and
authenticating the first device or the second device, wherein authenticating further comprises authenticating the one or more users associated with the first device or the second device.

* * * * *